(12) United States Patent
Si et al.

(10) Patent No.: US 12,513,648 B2
(45) Date of Patent: Dec. 30, 2025

(54) POSITIONING METHOD ON SIDELINK, TERMINAL, AND NETWORK SIDE DEVICE

(71) Applicant: VIVO MOBILE COMMUNICATION CO., LTD., Dongguan (CN)

(72) Inventors: Ye Si, Dongguan (CN); Yuanyuan Wang, Dongguan (CN); Huaming Wu, Dongguan (CN); Zixun Zhuang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 312 days.

(21) Appl. No.: 18/216,542

(22) Filed: Jun. 29, 2023

(65) Prior Publication Data

US 2023/0345409 A1   Oct. 26, 2023

Related U.S. Application Data

(63) Continuation of application No. PCT/CN2021/142839, filed on Dec. 30, 2021.

(30) Foreign Application Priority Data

Dec. 30, 2020   (CN) .......................... 202011626811.4

(51) Int. Cl.
*H04W 64/00* (2009.01)
*H04L 5/00* (2006.01)

(52) U.S. Cl.
CPC ........... *H04W 64/00* (2013.01); *H04L 5/0051* (2013.01)

(58) Field of Classification Search
CPC ..... H04W 64/00; H04W 4/023; H04W 92/18; H04W 56/00; H04W 4/40; H04L 5/0051; G01S 5/02; G01S 5/0009
See application file for complete search history.

(56) References Cited

U.S. PATENT DOCUMENTS

| | | | | |
|---|---|---|---|---|
| 2016/0095080 A1* | 3/2016 | Khoryaev | ............. | G01S 5/0284 455/456.1 |
| 2021/0297841 A1* | 9/2021 | Jung | ....................... | H04W 4/12 |

(Continued)

FOREIGN PATENT DOCUMENTS

| | | |
|---|---|---|
| CN | 106662634 A | 5/2017 |
| CN | 108141776 A | 6/2018 |

(Continued)

OTHER PUBLICATIONS

International Search Report issued in corresponding International Application No. PCT/CN2021/142839, mailed Mar. 21, 2022, 4 pages.

(Continued)

*Primary Examiner* — Kabir A Timory
(74) *Attorney, Agent, or Firm* — IPX PLLC

(57) ABSTRACT

A positioning method on a SideLink (SL), a terminal, and a network side device, are provided. A first terminal reports first location information, where the first location information includes at least one of the following: a first measurement result, where the first measurement result is obtained by the first terminal by measuring a first SL reference signal used for positioning, and the first SL reference signal is sent by a second terminal and/or a network side device; a second measurement result, where the second measurement result is an additional measurement result obtained by the first terminal by measuring the first SL reference signal in addition to the first measurement result; identifier information; time stamp information; calibration information; relative distance information; absolute location information; relative location information; target event information; and a second location information request, where the second location information request is used to instruct the second terminal to report location information.

20 Claims, 4 Drawing Sheets

(56) References Cited

U.S. PATENT DOCUMENTS

| | | | | |
|---|---|---|---|---|
| 2022/0086822 A1* | 3/2022 | Bao | ............... | G01S 1/024 |
| 2023/0164590 A1* | 5/2023 | Yamine | ............... | H04W 4/021 |
| | | | | 370/329 |
| 2023/0180188 A1* | 6/2023 | Wu | ............... | H04W 74/0816 |
| | | | | 370/329 |

FOREIGN PATENT DOCUMENTS

| | | | |
|---|---|---|---|
| CN | 110536234 A | 12/2019 |
| CN | 110972276 A | 4/2020 |
| CN | 111989964 A | 11/2020 |
| KR | 20200127680 A | 11/2020 |
| WO | 2020064120 A1 | 4/2020 |
| WO | 2020154228 A1 | 7/2020 |
| WO | 2020201959 A1 | 10/2020 |

OTHER PUBLICATIONS

Huawei et al., Discussion of sidelink positioning, 3GPP TSG RAN WG1 #101-e, R1-2004609, May 25-Jun. 5, 2020, 5 pages.
First Office Action issued in related Chinese Application No. 202011626811.4, mailed Jul. 16, 2025, 11 pages.

* cited by examiner

400

500

600

POSITIONING METHOD ON SIDELINK, TERMINAL, AND NETWORK SIDE DEVICE

CROSS-REFERENCE TO RELATED APPLICATIONS

This application is a continuation of International Application No. PCT/CN2021/142839, filed on Dec. 30, 2021, which claims priority to Chinese Patent Application No. 202011626811.4, filed on Dec. 30, 2020. The entire contents of each of the above-identified applications are expressly incorporated herein by reference.

TECHNICAL FIELD

This application pertains to the field of wireless communications technologies, and specifically relates to a positioning method on a SideLink (SL), a terminal, and a network side device.

BACKGROUND

In communications systems such as a 5th Generation New Radio (5G NR) system and a Long Term Evolution (LTE) system, SideLink (SL) transmission can be supported, that is, data transmission may be directly performed on a physical layer between User Equipment (UE, that is, terminal) without using a network side device.

However, for a service scenario such as Vehicle to Everything (Y2X) or Industrial Internet of Things (IIoT) related to an SL technology, although the related SL technology can satisfy basic security type communication of the V2X, the related SL technology cannot adapt to other more advanced V2X services such as a positioning service.

SUMMARY

Embodiments of this application provide a positioning method on a SideLink (SL), a terminal, and a network side device.

According to a first aspect, a positioning method on an SL is provided. The method is performed by a first terminal, and the method includes: reporting first location information, where the first location information includes at least one of the following: a first measurement result, where the first measurement result is obtained by the first terminal by measuring a first SL reference signal used for positioning, and the first SL reference signal is sent by a second terminal and/or a network side device; a second measurement result, where the second measurement result is an additional measurement result obtained by the first terminal by measuring the first SL reference signal except the first measurement result; identifier information; time stamp information; calibration information; relative distance information; absolute location information; relative location information; target event information, where the target event information is used to instruct the first terminal to report that the first location information is related to a target event; and a second location information request, where the second location information request is used to instruct the second terminal to report location information, where the identifier information, the time stamp information, the calibration information, the relative distance information, the absolute location information, and the relative location information are information associated with measuring the first SL reference signal by the first terminal.

According to a second aspect, a positioning method on an SL is provided. The method is performed by a second terminal or a network side device, and the method includes: receiving first location information, where the first location information includes at least one of the following: a first measurement result, where the first measurement result is obtained by a first terminal by measuring a first SL reference signal used for positioning, and the first SL reference signal is sent by the second terminal and/or the network side device; a second measurement result, where the second measurement result is an additional measurement result obtained by the first terminal by measuring the first SL reference signal except the first measurement result; identifier information; time stamp information; calibration information; relative distance information; absolute location information; relative location information; target event information, where the target event information is used to instruct the first terminal to report that the first location information is related to a target event; and a second location information request, where the second location information request is used to instruct the second terminal to report location information, where the identifier information, the time stamp information, the calibration information, the relative distance information, the absolute location information, and the relative location information are information associated with measuring the first SL reference signal by the first terminal.

According to a third aspect, a positioning apparatus on an SL is provided. The apparatus includes: a reporting module, configured to report first location information, where the first location information includes at least one of the following: a first measurement result, where the first measurement result is obtained by a first terminal by measuring a first SL reference signal used for positioning, and the first SL reference signal is sent by a second terminal and/or a network side device; a second measurement result, where the second measurement result is an additional measurement result obtained by the first terminal by measuring the first SL reference signal except the first measurement result; identifier information; time stamp information; calibration information; relative distance information; absolute location information; relative location information; target event information, where the target event information is used to instruct the first terminal to report that the first location information is related to a target event; and a second location information request, where the second location information request is used to instruct the second terminal to report location information, where the identifier information, the time stamp information, the calibration information, the relative distance information, the absolute location information, and the relative location information are information associated with measuring the first SL reference signal by the first terminal.

According to a fourth aspect, a positioning apparatus on an SL is provided. The apparatus includes: a receiving module, configured to receive first location information, where the first location information includes at least one of the following: a first measurement result, where the first measurement result is obtained by a first terminal by measuring a first SL reference signal used for positioning, and the first SL reference signal is sent by a second terminal and/or a network side device; a second measurement result; identifier information; time stamp information; calibration information; relative di stance information; ab solute location information; relative location information; target event information, where the target event information is used to instruct the first terminal to report that the first location information is related to a target event; and a second location information request, where the second location information request is used to instruct the second terminal to report location information, where the identifier information, the time stamp information, the calibration information, the relative distance information, the absolute location information, and the relative location information are information associated with measuring the first SL reference signal by the first terminal.

According to a fifth aspect, a terminal is provided. The terminal includes a processor, a memory, and a program or an instruction that is stored in the memory and that can be run on the processor, where the program or the instruction is executed by the processor to implement the steps of the method in the first aspect or the method in the second aspect.

According to a sixth aspect, a network side device is provided. The network side device includes a processor, a memory, and a program or an instruction that is stored in the memory and that can be run on the processor, where the program or the instruction is executed by the processor to implement the steps of the method in the second aspect.

According to a seventh aspect, a readable storage medium is provided. The readable storage medium stores a program or an instruction, and the program or the instruction is executed by a processor to implement the steps of the method in the first aspect or the steps of the method in the second aspect.

According to an eighth aspect, a chip is provided. The chip includes a processor and a communications interface, the communications interface is coupled to the processor, and the processor is configured to run a program or an instruction of a network side device to implement the method in the first aspect or the method in the second aspect.

According to a ninth aspect, a computer program product is provided. The computer program product includes a processor, a memory, and a program or an instruction that is stored in the memory and that can be run on the processor, where the program or the instruction is executed by the processor to implement the steps of the method in the first aspect or the steps of the method in the second aspect.

DETAILED DESCRIPTION

The following describes the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first," "second," and the like are intended to distinguish between similar objects but do not describe a specific order or sequence. It should be understood that, the terms used in such a way are interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. The following descriptions describe a New Radio (NR) system for example purposes, and NR terms are used in most of the following descriptions, but these technologies can also be applied to an application other than an NR system application, for example, a 6th Generation (6G) communications system.

Figure 1:
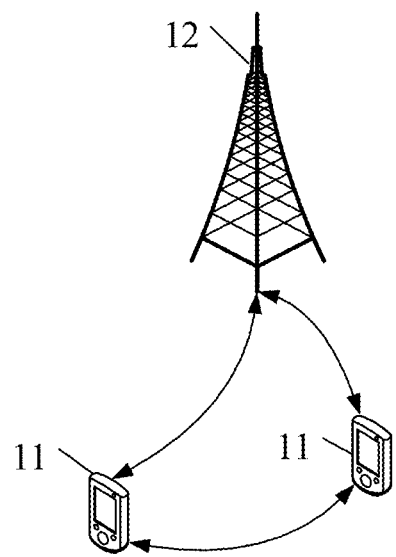
FIG. 1 is a schematic diagram of a wireless communications system according to an example embodiment of this application.

FIG. 1 is a block diagram of a wireless communications system to which embodiments of this application can be applied. The wireless communications system includes a terminal 11 and a network side device 12. The terminal 11 may also be referred to as a terminal device or a user terminal. The terminal 11 may be a terminal side device such as a mobile phone, a tablet personal computer, a laptop computer or a notebook computer, a Personal Digital Assistant (PDA), a palmtop computer, a netbook, an Ultra-Mobile Personal Computer (UMPC), a Mobile Internet Device (MID), a wearable device, Vehicle User Equipment (VUE), or Pedestrian User Equipment (PUE). The wearable device includes a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a Wi-Fi node, a Transmitting Receiving Point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

With reference to the accompanying drawings, the technical solutions provided in the embodiments of this application are described in detail by using specific embodiments and application scenarios.

Figure 2:
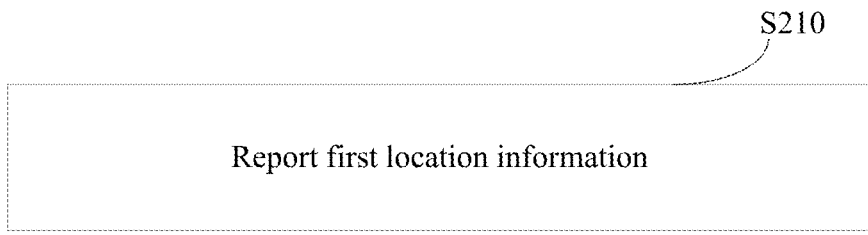
FIG. 2 is a schematic flowchart of a positioning method on an SL according to an example embodiment of this application.

As shown in FIG. 2, FIG. 2 is a schematic flowchart of a positioning method 200 on an SL according to an example embodiment of this application. The method 200 may be performed by a first terminal, for example, may be performed by hardware and/or software installed in the first terminal, and the method 200 includes at least the following S210.

S210: Report first location information.

It should be noted that the "report (Report)" in this embodiment may further be represented as "sending," "responding," "reporting," or the like. For example, before the first location information is reported, if the first terminal receives a first SL reference signal sent by a second terminal or a network device, the first terminal may then 'respond (Respond)' the first location information corresponding to the SL reference signal. For another example, before the first location information is reported, if the first terminal receives a first location information request sent by the second terminal or the network device, the first terminal may 'respond (Respond)' the first location information.

The first location information may include one or more pieces of information, and may be specifically determined according to a positioning requirement on the SL. For example, in an implementation, the first location information may include at least one of the following (1) to (10):

(1) First measurement result.

The first measurement result is obtained by the first terminal by measuring a first SL reference signal, and the first SL reference signal may be a reference signal on the sidelink, or a reference signal used for positioning on the sidelink.

In this embodiment, the first SL reference signal may be sent by the second terminal and/or the network side device to the first terminal, or may be preconfigured in the first terminal. Correspondingly, in a case that the first SL reference signal is sent by the second terminal and/or the network side device to the first terminal, the first terminal may also send a second SL reference signal to the second terminal and/or the network side device.

For ease of description, the following uses the first SL reference signal as an example, and the first SL reference signal is used for terminal positioning. For example, the first SL reference signal may be used to locate a distance between the first terminal and the second terminal, a distance between the first terminal or the second terminal and a control node, a relative location of the first terminal and/or an absolute position of the first terminal, and a relative location of the second terminal and/or an absolute position of the second terminal, and the control node may be a network side device (for example, a base station, a serving base station, or a location server), another terminal, or another control device. This is not limited in this embodiment.

In an implementation, the first SL reference signal includes but is not limited to at least one of a Synchronization Signal Block (SSB), a Positioning Reference Signal (PRS), a Channel State Information Reference Signal (CSI-RS), a DeModulation Reference Signal (DMRS), and the like on the sidelink. In this embodiment, the first SL reference signal may be transmitted in a unicast, broadcast, or multicast manner.

On the basis of the foregoing content, the first measurement result obtained by the first terminal by measuring the first SL reference signal may include a difference between a first time and a second time, which may be understood as an RX-TX time difference.

The first time is a time at which the first terminal receives the first SL reference signal sent by the second terminal or the network side device. In an implementation, the first time may be a time at which the first terminal receives a specified path of a predetermined SL time unit i. The specified path of the predetermined SL time unit i is determined according to the first SL reference signal. The SL time unit may include but is not limited to an SL slot, an SL sub-slot, an SL symbol (OFDM symbol), and the like, and the specified path may be a first path (first path, that is, a first arrival path), a strongest path, or a best path. Taking the optimal path as an example, the first terminal may comprehensively determine which path is best, and may use the path as the optimal path.

In some implementations, that the first time is a time at which the first terminal receives a specified path of a predetermined SL time unit i may be understood as that the first time is a time at which the first terminal receives (a start location of) the predetermined SL reference time unit i. In an implementation, the time of (the start location) of the SL reference time unit i is defined or determined by the predetermined path. For example, the first time is a time at which the first terminal receives a start location of an SL subframe i, and the time of the start location of the SL subframe i is defined or determined by a predetermined path corresponding to the start location of the SL subframe i.

For example, assuming that the predetermined SL time unit is an SL subframe i, and the specified path is a first path, the first time may be a time at which the first terminal receives the first path of the SL subframe i of the second terminal. The first path of the SL subframe i of the second terminal may be determined according to the first SL reference signal. In addition, the first time may be a start time at which the first terminal receives a predetermined SL time unit of the second terminal, for example, a start time of the SL subframe i.

The second time is a time at which the first terminal sends the second SL reference signal. In an implementation, the second time is a corresponding time at which the first terminal sends a target SL time unit j, and the time of sending the target SL time unit j and a time of receiving the predetermined SL time unit i satisfy a predetermined requirement. In some implementations, the corresponding time of sending the target SL time unit j may be understood as a time corresponding to a start location of sending the target SL time unit j.

The predetermined requirement may be set according to an actual requirement, for example, the time of sending the target SL time unit j is closest to the time of receiving the predetermined SL time unit i. For example, assuming that the predetermined SL time unit is an SL subframe i, the second time may be a time of an SL subframe of the first terminal that is closest to the time of receiving the SL subframe i, and the time may be a start time or a sending time of the SL subframe. This is not limited herein.

It should be noted that in this embodiment, reference points corresponding to the first time and/or the second time may satisfy the following (1a) or (1b).

(1a) For a first frequency range (FR1), a reference point of the first time is a receive antenna connection point of the first terminal, and the second time is a transmit antenna connection point of the first terminal.

(1b) For a second frequency range (FR2), a reference point of the first time is a receive antenna of the first terminal, and the second time is a transmit antenna of the first terminal.

The first frequency range and the second frequency range in the foregoing (1a) and (1b) may be set according to an actual requirement. This is not limited herein.

It should be noted that, for the first measurement result, in addition to being obtained by the first terminal by measuring the first SL reference signal, the first measurement result may be a measurement result obtained after another terminal except the first terminal measures an SL reference signal, that is, the first measurement result is not limited to the difference between the first time and the second time, but may further include a Reference Signal Time Difference (RSTD), a Reference Signal Received Power (RSRP), an Angle of Arrival (AOA), an Angle-of-Departure (AOD), and the like.

(2) Identifier information.

The identifier information is information associated with measuring the first SL reference signal by the first terminal, for example, measuring identifier information of an antenna, a terminal, a resource, and the like in the first SL reference signal. In an implementation, the identifier information may include at least one of the following (2a) to (2c).

(2a) Identifier information of a receive antenna port or a receive antenna panel, used to indicate a receive antenna port or a receive antenna panel to which the first location information is associated.

(2b) Identifier information of the first terminal and/or identifier information of the second terminal.

The identifier information of the first terminal and/or the identifier information of the second terminal may be obtained in any one of the following manners.

Manner 1: Being allocated by the control nod. For example, in a zone, the identifier information of the first terminal and/or the identifier information of the second terminal are unique terminal identifiers allocated by the control node.

It should be noted that in this application, the control node may be a network side device (for example, a base station, a serving base station, or a location server), a terminal, or another control device. Details are not described later.

Manner 2: Being predefined in the protocol or preconfigured by a vendor.

Manner 3: Being determined by the first terminal and/or the second terminal according to a resource set that is broadcast by the control node, preconfigured by the network, or predefined in the protocol.

Manner 4: Being generated by the first terminal and/or the second terminal according to higher layer signaling, for example, an identifier of an application layer or an Internet Protocol (IP) layer, a terminal identifier of a Medium Access Control (MAC) layer, or a group identifier and/or an intra-group identifier allocated by higher layer signaling.

Manner 5: Being allocated through the SL, for example, the second terminal allocates the identifier information to the first terminal through the SL.

Manner 6: Being generated by the first terminal and/or the second terminal according to a manner/rule indicated by the control node or stipulated in the protocol.

Manner 7: Source IDentifier information (Source ID).

Manner 8: Destination IDentifier information (Destination ID).

Manner 9: Group identifier information and/or intra-group identifier information.

(2c) An identifier of an SL reference signal or an SL reference signal resource.

For example, an identifier of the first SL reference signal sent by the second terminal, an identifier of the second SL reference signal sent by the first terminal, or an identifier of a reference signal resource may be included.

The reference signal resource may be a resource corresponding to the first SL reference signal and/or the second SL reference signal. In an implementation, the identifier of the reference signal or the reference signal resource may be obtained in any one of the following manners.

Manner 1: Being allocated by the control node, for example, a resource IDentifier (resource ID), a sequence IDentifier (sequence ID), and a scrambling IDentifier (scrambling ID), used to carry one or more cyclic displacements and/or cyclic displacement pairs and/or cyclic displacement groups.

Manner 2: Being predefined in the protocol.

Manner 3: Being obtained by the first terminal and/or the second terminal according to a resource set that is broadcast by the control node, preconfigured, or predefined in the protocol.

Manner 4: Being generated by the first terminal and/or the second terminal according to higher layer information.

Manner 5: Being allocated through the SL.

Manner 6: Being generated according to a manner/rule indicated by the control node or stipulated in the protocol.

Manner 7: The second terminal and/or the first terminal send identifiers of a plurality of reference signal resources, where the identifiers herein further include resource identifiers, resource set identifiers, and the like for distinguishing the plurality of reference signal resources. A reference signal resource in a resource set may be associated with a spatial filter (beam).

(3) Second measurement result.

The second measurement result is an additional measurement result (or may be understood as another measurement result) obtained by the first terminal by measuring the first SL reference signal except the first measurement result. In an implementation, the second measurement result includes at least one of the following (3a) to (3i):

(3a) Additional path (Additional path, that is, an additional arrival path) measurement result. That is, after receiving the first SL reference signal sent by the second terminal, the first terminal may report, in addition to an RX-TX measurement result (that is, the first location information) of a first path, additional path measurement results corresponding to N additional RX paths except the first path. N depends on a capability of the first terminal.

In an implementation, the additional path measurement result includes at least one of the following:

a differential measurement result of an additional path relative to a reference path in terms of time, where the reference path may be the first path;

a power or a relative power of each path, where the relative power is a power relative to the reference path, the reference path may be the first path, and the power or the relative power may be represented by an RSRP value;

an angle measurement result of an AoA corresponding to each path;

measurement quality information of each path;

indication information of a strongest path and/or a median path, where the indication information is used to indicate whether a reported path is the median path and a relative time difference relative to an RSTD;

a power value of the strongest path and/or the median path;

a power ratio of the first path to the strongest path and/or the median path;

a relative power of the strongest path and/or the median path and the first path;

a power ratio of the first path to the additional path;

a relative power of the additional path and the first diameter;

a channel delay power spectrum;

a quantized delay power spectrum;

a channel impact response;

a quantized channel impact response; and a K-factor.

(3b) Granularity indication of the first location information (for example, an RX-TX time measurement result).

(3c) Line-of-Sight transmission (LOS)/Non-Line-of-Sight transmission (NLOS) indication information.

The LOS/NLOS indication information is used to indicate LOS/NLOS state information, LOS/NLOS identification quality or confidence information, and the like. In addition, the indication information may further indicate whether a channel between the first terminal and the second terminal is LOS or NLOS. This is not limited herein.

(3d) Spatial measurement information.

The spatial measurement information includes at least one of the following:

polarization information of an antenna element;

power/energy information of a first path on the antenna element;

a maximum value of a power/energy of a first path on an antenna element in a same polarization direction;

a minimum value of the power/energy of the first path on the antenna element in the same polarization direction;

a reference value of the power/energy of the first path on the antenna element in the same polarization direction;

a difference between the maximum value and the minimum value of the power/energy of the first path on the antenna element in the same polarization direction;

a reference range value of the power/energy of the first path on the antenna element in the same polarization direction;

phase information of the first path on the antenna element;

a maximum value of a phase of a first path on an antenna element in different polarization directions;

a minimum value of the phase of the first path on the antenna element in different polarization directions;

a reference value of the phase of the first path on the antenna element in different polarization directions;

a difference between the maximum value and the minimum value of the phase of the first path on the antenna element in different polarization directions;

a reference range value of the phase of the first path on the antenna element in different polarization directions;

power/energy information of an additional path on an antenna element in a same polarization direction;

a maximum value of a power/energy of the additional path on the antenna element in the same polarization direction;

a minimum value of the power/energy of the additional path on the antenna element in the same polarization direction;

a reference value of the power/energy of the additional path on the antenna element in the same polarization direction;

a difference between the maximum value and the minimum value of the power/energy of the additional path on the antenna element in the same polarization direction;

a reference range value of the power/energy of the additional path on the antenna element in the same polarization direction;

phase information of an additional path on an antenna element in different polarization directions;

a maximum value of a phase of the additional path on the antenna element in different polarization directions;

a minimum value of a phase of the additional path on the antenna element in different polarization directions;

a reference value of a phase of the additional path on the antenna element in different polarization directions;

a difference between the maximum value and the minimum value of the phase of the first path on the antenna element in different polarization directions;

a reference range value of the phase of the first path on the antenna element in different polarization directions;

a first feature of the power/energy of the first path on the antenna element in the same polarization direction, where the first feature includes but is not limited to: whether being consecutive, whether being less than a threshold, and whether being greater than a threshold;

a second feature of the phase of the first path on the antenna element in different polarization directions, where the second feature includes but is not limited to: whether being consecutive, whether being less than a threshold, and whether being greater than a threshold;

a first feature of the power/energy of each additional path on the antenna element in the same polarization direction, where the first feature includes but is not limited to: whether being consecutive, whether being less than a threshold, and whether being greater than a threshold; and a second feature of the phase of each additional path on the antenna element in different polarization directions, where the second feature includes but is not limited to: whether being consecutive, whether being less than a threshold, and whether being greater than a threshold.

The first threshold and the second threshold may be set according to an actual requirement. This is not limited herein.

(3e) Frequency domain measurement information.

The frequency domain measurement information may include at least energy/power of each subcarrier of a frequency domain channel, a maximum value of energy/power of the frequency domain channel, a minimum value of the energy/power of the frequency domain channel, a difference between the maximum value and the minimum value of the energy/power of the frequency domain channel, a reference value of the energy/power of the frequency domain channel, a reference range value of the energy/power of the frequency domain channel, and the like.

(3f) At least one of a Doppler offset, a Doppler spread, a delay spread, a coherence time, and a coherence bandwidth of a channel between the first terminal and the second terminal.

(3g) Signal-to-Noise Ratio (SNR) or Signal to Interference & Noise Ratio (SINR).

(3h) Measurement quality.

(3i) Speed information of the first terminal, including at least one of a speed size and a direction of the first terminal. The speed herein may be an absolute speed or a relative speed relative to the second terminal or a control node.

(4) Time stamp information.

The time stamp information is information associated with measuring the first SL reference signal by the first terminal. For example, the time stamp information may be time information associated with a current measurement result. In an implementation, the time stamp information may include at least the following (4a) and/or (4b).

(4a) Times tamp of the first terminal corresponding to the first SL reference signal, including at least one of a System Frame Number (SFN), a slot number, and a subframe number. In an implementation, the time stamp may be determined based on a timing of the SL or a timing of uu (a control node, for example, a serving cell).

(4b) Times tamp of an SL subframe corresponding to the second SL reference signal, including at least one of a subframe number or an SFN number of the SL subframe. In an implementation, the SL subframe may be further replaced with an SL slot time stamp, a terminal identifier associated with a times tamp, an identifier of a control node, or the like.

(5) Calibration information.

The calibration information is information associated with measuring the first SL reference signal by the first terminal. In an implementation, the calibration information includes at least: for an RX-TX measurement result, whether the first terminal has calibrated a timing error for receiving an RX (for example, the first SL reference signal) and/or a TX (for example, the second SL reference signal), such as an RX group delay error and/or a TX group delay error, and whether an RX-TX measurement result of a previous group delay is added or extracted; and for a plurality of RX-TX measurement results, whether to use identifier information of a same receive antenna or antenna panel and/or corresponding antenna panel; and a size of an RX and/or TX group delay error, and the like.

(6) Relative distance information.

The relative distance information includes distance information between the first terminal and the second terminal, distance information between the first terminal or the second terminal and the control node, and the like.

(7) Absolute location information.

The absolute location information includes absolute location information of the first terminal, the second terminal, or the control node.

(8) Relative location information.

The relative location information includes absolute location information of the first terminal, the second terminal, or the control node.

The relative distance information, the relative location information, and the absolute location information in the foregoing (6) to (8) are all information associated with measuring the first SL reference signal by the first terminal. In some implementations, the information in the foregoing (6) to (8) may be used to assist the first terminal in measuring the first SL reference signal.

In an implementation, the information in the foregoing (2) and (4) to (8) may be actively obtained by the first terminal, or may be sent by another device (for example, the network side device or the second terminal). This is not limited herein.

(9) Target event information.

The target event information is used to instruct the first terminal to report that the first location information is related to a target event. For example, when the first terminal determines to report the first location information, the first location information includes the associated target event information. For the target event information, refer to descriptions of Example 1 to Example 6 in the following method 300. Details are not described herein.

In an implementation, the target event information may be related to an event trigger report. For example, when the first terminal detects that some target events occur, the first location information is reported, and the first location information includes the target event information, to indicate which event is detected by the UE.

(10) Second location information request.

The second location information request is used to instruct the second terminal to report location information.

In an implementation, after receiving the first location information, the first terminal requests the second terminal to further report location information such as relative distance information between the second terminal and the first terminal, absolute (or relative) location information of the second terminal, and a measurement result (for example, RX-TX time difference information) of the second terminal.

In this embodiment, a first terminal measures a first SL reference signal sent by a second terminal and/or a network side device, and reports first location information, to implement terminal positioning. Therefore, an SL technology can adapt to other more advanced V2X services such as a positioning service.

Figure 3:
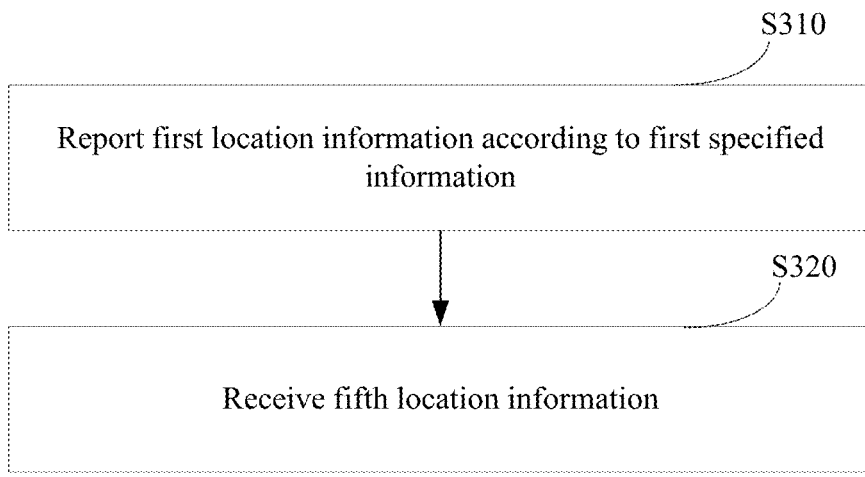
FIG. 3 is a schematic flowchart of a positioning method on an SL according to another example embodiment of this application.

As shown in FIG. 3, FIG. 3 is a schematic flowchart of a positioning method 300 on an SL according to an example embodiment of this application. The method 300 may be performed by a first terminal, for example, may be performed by hardware and/or software installed in the first terminal, and the method 300 includes at least the following S310 to S320.

S310: Report first location information according to first specified information.

For an implementation process of the S310, refer to the related descriptions in the method 200. In an implementation, the first specified information may include at least one of the following (1) to (6):

(1) Geographical location information.

The geographical location information includes but is not limited to zone information, longitude and latitude information, and the like of the first terminal and/or the second terminal.

(2) Measurement information.

For the measurement information, refer to the descriptions in the method 200. In addition, the measurement information may further include measured received power information, measurement quality, and the like.

(3) Fleet information.

The fleet information may indicate whether the first terminal and the second terminal are in a same group or fleet. For example, when both the first terminal and the second terminal are in-vehicle terminals, the first terminal and the second terminal are in one fleet.

(4) Moving information.

The moving information includes a moving distance and/or a moving speed, for example, moving information of the first terminal or the second terminal.

(5) Whether a first location information request is received.

The first location information request is used to instruct the first terminal to report the first location information. In an implementation, a difference between a reporting time of the first location information and a receiving time of the first location information request is not greater than a fourth predetermined value, and the fourth predetermined value may be stipulated in the protocol, indicated by the network side device, or reported according to a terminal capability.
- (6) Synchronization information or Radio Resource Control (RRC) connection information with the second terminal.

Based on the foregoing descriptions of the first specified information, the following describes an implementation process of the foregoing S310 with reference to different examples.

Example 1

In a case that the first specified information is the geographical location information, the reporting first location information according to first specified information in S310 includes any one of the following (1) to (9):
- (1) Report the first location information in a case that a distance between the second terminal and the first terminal satisfies a first condition; otherwise, not report the first location information.

The first condition may be being greater than, equal to, or lower than a predetermined value. In an implementation, the predetermined value may be determined according to a communication range value carried in control information.
- (2) Report the first location information in a case that a zone in which the first terminal is located is the same as a zone in which the second terminal is located; otherwise, not report the first location information.

For example, if both the first terminal and the second terminal are in a zone A, the first terminal does not report the first location information.
- (3) Report the first location information in a case that a zone identifier corresponding to the first terminal is the same as a zone identifier corresponding to the second terminal; otherwise, not report the first location information.
- (4) Report the first location information in a case that a specified operation is performed on the zone identifier corresponding to the first terminal and the zone identifier corresponding to the second terminal and an operation result satisfies a second condition; otherwise, not report the first location information.

The specified operation may be an addition/subtraction/multiplication/division or a module 2 operation, and the second condition may be that the operation result is less than, equal to, or greater than a threshold. For example, when the operation result is less than a threshold, it may be determined that the second condition is satisfied and the first location information is reported.
- (5) Report the first location information in a case that the zone in which the second terminal is located and the zone in which the first terminal is located differ by a predetermined quantity of zones in a specified dimension; otherwise, not report the first location information.

The specified dimension includes but is not limited to a longitude and/or a latitude.
- (6) Report the first location information in a case that the zone identifier corresponding to the first terminal is a first predetermined value; otherwise, not report the first location information.

For example, assuming that the first predetermined value is 1, in a case that the zone identifier (zone ID) corresponding to the first terminal is 1, the first location information is reported.
- (7) Report the first location information in a case that the zone identifier corresponding to the second terminal is a second predetermined value; otherwise, not report the first location information.
- (8) Report the first location information in a case that specified control information received by the first terminal carries the zone identifier corresponding to the second terminal; otherwise, not report the first location information.

The specified control information includes but is not limited to Sidelink Control Information (SCI) and the like.
- (9) Report the first location information in a case that the second terminal leaves a specified zone; otherwise, not report the first location information. The specified zone may be set according to a requirement. This is not limited herein.

It should be noted that the zone in the foregoing (1) to (9) may be a zone defined in the sidelink, and the zone identifier may be a zone ID.

Example 2

In a case that the first specified information is the measurement information, the reporting, by the first terminal, first location information according to first specified information in S310 includes any one of the following (1) to (5):
- (1) Report the first location information in a case that the measurement information includes an RSRP of the first SL reference signal and the RSRP of the first SL reference signal satisfies a third condition; otherwise, not report the first location information.
- (2) Report the first location information in a case that the measurement information includes an RSRP of specified control information corresponding to the second terminal and the RSRP of the specified control information satisfies a fourth condition; otherwise, not report the first location information.

The specified control information may include but is not limited to SCI and the like.
- (3) Report the first location information in a case that the measurement information includes an RSRP of a specified channel corresponding to the second terminal and the RSRP of the specified channel satisfies a fifth condition; otherwise, not report the first location information.

In an implementation, if measurement is performed on the RSRP based on a DeModulation Reference Signal (DMRS), the specified channel may be a Physical Sidelink Control CHannel (PSCCH), a Physical Sidelink Shared CHannel (PSSCH), or the like.
- (4) Report the first location information in a case that the measurement information includes an RSRP of specified request signaling corresponding to the second terminal and the RSRP of the specified request signaling satisfies a sixth condition; otherwise, not report the first location information.

The specified request signaling may include but is not limited to location information request signaling, measurement result request signaling, or the like.
- (5) Report the first location information in a case that the measurement information includes measurement quality of the first SL reference signal and the measurement quality satisfies a seventh condition; otherwise, not report the first location information.

It should be noted that in the foregoing several implementations, the third condition, the fourth condition, the fifth condition, the sixth condition, and the seventh condition may be set according to a requirement. Taking the third condition an example, the third condition may be being greater than, equal to, or not less than a threshold. This is not limited in this embodiment.

Example 3

In a case that the first specified information is the moving information, the reporting first location information according to first specified information in S310 includes any one of the following (1) to (3):

(1) Report the first location information in a case that the moving information includes a moving distance and the moving distance exceeds a third predetermined value, where the moving distance is a relative distance between a current terminal location and a first location, the first location is a location at which the second terminal reports location information last time, and a reporting time is earlier than a time of reporting the first location information. In some implementations, the moving distance is a straight line distance or the like.

For example, if a moving distance during current reporting of the first terminal exceeds a threshold relative to a moving distance during previous reporting, the first location information is reported. Otherwise, the first location information is not reported.

(2) Report the first location information in a case that the moving information includes a moving speed and a moving speed of the second terminal satisfies an eighth condition; otherwise, not report the first location information.

The eighth condition may be that a moving speed of the first terminal exceeds or is less than a threshold. This is not limited in this embodiment.

(3) Report the first location information in a case that the moving information includes a moving speed and a difference between the moving speed of the second terminal and a moving speed of the first terminal or a control node satisfies a ninth condition; otherwise, not report the first location information.

The ninth condition may be that a speed of the first terminal relative to the second terminal exceeds or is less than a threshold. This is not limited in this embodiment.

Example 4

In a case that the first specified information is whether the first location information request is received, the reporting first location information according to first specified information in S310 may include: reporting, by the first terminal, the first location information in a case that the first location information request is received.

In this embodiment, the first location information request may be transmitted by using predetermined information, and the predetermined information may include any one of first-level SCI, second-level SCI, a PSSCH, PC5-RRC, a PC5-Medium Access Control-Control Element (MAC CE), an LTE Positioning Protocol (LPP), a MAC CE, RRC, Downlink Control Information (DCI), Non-Access Stratum (NAS) signaling, a PC5-NAS, and a PC5-LPP, where PC5 indicates an interface between terminals. In some implementations, the first location information request is transmitted simultaneously with the first SL reference signal; and the first location information request is carried in a payload of the first SL reference signal. In some implementations, the first location information request may be transmitted in unicast, broadcast, or multicast. In some implementations, the 'location information request' herein may further indicate a 'location service request'.

In a possible implementation, the first location information request may carry at least one of the following (1) to (17):

(1) First location information request identifier.

The first location information request identifier is used to request the second terminal to report the first location information.

In an implementation, the second location information may be indicated by 1 bit and carried in SCI (for example, second-level SCI) for transmission.

(2) Type of the first location information.

The type of the first location information includes but is not limited to at least one of location information, a measurement result, and event information. The location information may include but is not limited to relative distance information, relative location information, absolute location information, and the like. The measurement result includes but is not limited to at least one of an RX-TX time difference, an SL reference signal time difference, a reference signal received power, a reference signal angle of arrival, and the like. For the event information, refer to the descriptions of Example 1 to Example 6 in the method 300.

(3) Priority indication information.

The priority indication information may include a measured priority, or a priority of the first SL reference signal, or a priority of REPORTING the first location information, or a priority of the first terminal or the second terminal.

In an implementation, if the first terminal may measure SL reference signals corresponding to a plurality of second terminals within a specific time interval, each SL reference signal may be measured according to the priority indication information.

(4) Reporting time requirement.

The reporting time requirement may be that the first terminal needs to report the first location information within a predetermined time after receiving the first location information request, that is, a measurement result. The predetermined time may be set according to an actual requirement. This is not limited herein.

(5) Quality of Service (QoS) indication.

The quality of service indication may include a precision requirement indication, a measurement quality indication, and the like. This is not limited herein.

(6) Whether an LOS/NLOS indication is required.

(7) Whether an additional path is required.

In an implementation, in a case that the additional path is required, the first location information request may further include a quantity of required additional paths, identifiers, and the like.

(8) Quantity of measurement results.

(9) Measurement result granularity.

(10) Whether calibration information needs to be reported.

For the calibration information, refer to the related descriptions in the method 200. Details are not described herein again.

(11) Whether identifier information needs to be reported.

For the identifier information, refer to the related descriptions in the method 200. Details are not described herein again.

(12) Whether a power measurement result is included.

The power measurement result may be but is not limited to an RSRP.

(13) Location information report type.

The location information report type may include at least one of a periodic report, an aperiodic report, an event trigger report, and an immediate report. In some implementations, when the first terminal supports a plurality of report types, one of the report type may be indicated in the first location information request.

It should be noted that the foregoing immediate report may be understood as that the first terminal reports location information within a reporting time after receiving the first location information request.

The periodic report may be understood as reporting the first location information according to a predefined or indicated periodic report. The first location information request may include a parameter of the periodic report, such as a period or a period quantity.

The event triggering report may be understood as reporting location information if the first terminal detects that an event occurs. In some implementations, the request signaling further includes a parameter of the event trigger report, and is used to assist the first terminal in reporting according to event trigger location information, and includes but is not limited to a type indication of event information, zone information of a zone event, moving information of a moving event, a maximum and minimum time interval between consecutive event reports, a maximum and/or minimum event sampling interval (the maximum/minimum event sampling interval, that is, an interval at which UE monitors an event), moving distance threshold information, and the like. In some implementations, the event information is used by the first terminal to determine whether to report location information.

The aperiodic report may be understood as: the first terminal reports the first location information in an aperiodic trigger manner, for example, triggers by using DCI or second-level SCI.

(14) Report resource indication information corresponding to the first location information.

The report resource indication information may indicate a time domain location, a frequency domain location, Modulation and Coding Scheme (MCS) information, a quantity of ports, and the like.

(15) Resource indication information of the first SL reference signal.

The resource indication information may indicate a time domain location, a frequency domain location, MCS information, a quantity of ports, sequence information, mapping information, and the like.

(16) Reporting manner of the first location information.

The reporting manner includes but is not limited to one of the following (16a) to (16c).

(16a) Unicast, multicast or broadcast.

In an implementation, the reporting manner is the same as a transmission manner of the first SL reference signal. For example, both the reporting manner and the first SL reference signal are transmitted in a unicast manner.

In this case, the first location information request may also be transmitted in a form of unicast, multicast, or broadcast. This is not limited herein.

(16b) Individual reporting or coupling reporting

In a case that coupling and reporting are performed on the first location information and another measurement signal, a process in which the first terminal reports the first location information may include: performing coupling and reporting on the first location information and second specified information, where the second specified information includes at least one of an SL-RSRP, SL-CSI, and a Hybrid Automatic Repeat reQuest (HARQ).

(16c) Whether a HARQ information report needs to be combined.

In a case that the HARQ information report needs to be combined, before reporting the first location information, the first terminal may first send HARQ information to the second terminal and/or the control node, where the HARQ information is used to instruct to perform or not to perform the step of reporting first location information, and the HARQ information is associated with the first SL reference signal and/or the first location information request. In some implementations, the HARQ information is sent after the first terminal receives the first SL reference signal or the first location information request.

In an implementation, if measurement quality corresponding to the first SL reference signal is poor or a measurement result is less than a predetermined threshold, a Negative ACKnowledgement (NACK) may be reported in the HARQ information. Correspondingly, in a case that the HARQ information is a NACK, the first terminal does not perform the step of reporting first location information. In this case, the first terminal may further request, based on the HARQ information, the second terminal to resend the first SL reference signal.

If the measurement quality corresponding to the first SL reference signal is good or the measurement result is not less than a predetermined threshold, an ACKnowledgement (ACK) may be reported in the HARQ information. Correspondingly, in a case that the HARQ information is an ACK, the step of reporting first location information is performed.

In addition, if the first terminal does not send the HARQ information, the first terminal may not report the first location information.

In some implementations, if the first terminal does not send the HARQ information, the first terminal reports the first location. For example, when the first terminal sends the HARQ information, the HARQ information includes only a NACK, instead of a NACK and an ACK. Only the first terminal feeds back the HARQ information that is a NACK, and the terminal does not report the first location.

In addition, the HARQ information is associated with the first SL reference signal and/or the first location information request. That is, the first terminal determines, according to at least one of measurement of the first SL reference signal, measurement of the first location information request, or indication of the first location information, whether to feed back a HARQ and/or content the HARQ information.

It should be noted that both the HARQ information and the first location information may be reported based on a Physical Sidelink Feedback CHannel (PSFCH). The PSFCH is a channel dedicated for sidelink ranging.

(17) Target event information, where the target event information is used by the first terminal to determine whether to report the first location information.

Example 5

In a case that the first specified information is the synchronization information or the RRC connection information with the second terminal, the reporting first location information according to first specified information includes: reporting the first location information in a case that the first terminal establishes synchronization with the second terminal or in a case that there is an RRC connection between the first terminal and the second terminal; otherwise, not reporting the first location information.

It can be understood that if no synchronization or no RRC connection is established between the first terminal and the second terminal, it indicates that the first terminal does not expect to measure the first SL reference signal, and/or the first terminal does not expect to receive the first location information request, and/or does not expect to report a measurement result, or the like.

Example 6

In a case that the first specified information is the fleet information, the reporting first location information according to first specified information includes: reporting, by the first terminal, the first location information in a case that the first terminal and the second terminal are in a same group or fleet; otherwise, not reporting the first location information.

It should be noted that if the first terminal and the second terminal are in a same group or fleet, the first terminal and the second terminal share a same group ID or fleet ID.

It should be noted that in the foregoing examples 1 to 6, the first condition, the second condition, . . . , the zone, the zone identifier, the first predetermined value, . . . and the like may be predefined in the protocol, may be obtained by configuring a resource pool (per resource pool) of the second terminal, the control node, or another terminal, or may be carried in the first location information request (for example, the target event information in the first location information request). In addition, the first condition, the second condition, . . . the zone, the zone identifier, and the first predetermined value, . . . and the like may be related to a service QoS parameter (for example, a PDB) of the first terminal or the second terminal, or may be related to a SubCarrier Spacing (SCS) of a BandWidth Part (BWP) in which the first terminal or the second terminal is located. This is not limited in this embodiment.

It should be further noted that, in an implementation, in addition to reporting the first location information according to the first specified information, the first terminal may further periodically report the first location information and the like. This is not limited herein.

S320. Receive fifth location information.

The fifth location information may be sent by the second terminal after receiving the second location information request sent by the first terminal, or may be reported based on specified information (refer to the foregoing first specified information). This is not limited herein. In an implementation, the fifth location information includes at least one of the following (1) to (3):
  (1) relative distance information between the second terminal and the first terminal;
  (2) absolute location information of the second terminal; and
  (3) relative location information of the second terminal.

It can be understood that the second location information may include but is not limited to the foregoing (1) to (3).

In this embodiment, after receiving a first SL reference signal, a first terminal reports first location information based on a first specified signal, thereby improving reliability of a positioning procedure on an SL, and further satisfying a higher service requirement.

Figure 4:
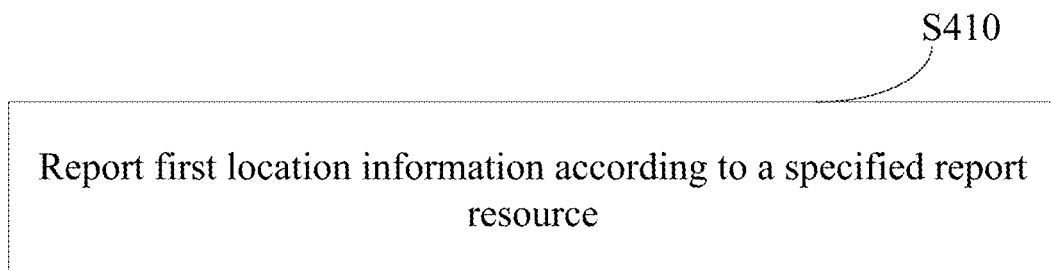
FIG. 4 is a schematic flowchart of a positioning method on an SL according to still another example embodiment of this application.

As shown in FIG. 4, FIG. 4 is a schematic flowchart of a positioning method 400 on an SL according to an example embodiment of this application. The method 400 may be performed by a first terminal, for example, may be performed by hardware and/or software installed in the first terminal, and the method 400 includes at least the following S410 to S430.

S410. Receive a first SL reference signal sent by a second terminal.

For an implementation process of the S410, refer to the related descriptions in the foregoing methods 200 and 300. To avoid repetition, details are not described herein again.

S420: Report first location information according to a specified report resource.

For an implementation process of the S410, refer to the related descriptions in the foregoing methods 200 and 300. In an implementation, the specified report resource is obtained in one of the following manners (1) to (4).

(1) Protocol stipulation.

For example, the protocol stipulation may preconfigure the specified report resource based on a resource pool and indicate a resource or resource configuration by using first-level SCI. For another example, a plurality of periods may be configured or preconfigured through the PC5-RRC stipulation, and a report resource or resource configuration may be indicated by using second-level SCI. For another example, the specified report resource may be determined according to a rule stipulated in the protocol and based on information about a preconfigured report resource pool, or a report resource.

(2) Predetermined correspondence.

The predetermined correspondence represents a correspondence between a sending resource corresponding to the first SL reference signal and a report resource corresponding to the first location information, and/or the predetermined correspondence represents a correspondence between identifier information of the second terminal and the report resource corresponding to the first location information.

(3) Preconfigured resource pool or resource set.

In an implementation, before performing S420, the first terminal may configure the resource set or resource pool for sending the location information request. In this case, a manner of obtaining the specified report resource by the first terminal through the preconfigured resource pool or resource set may include: obtaining a candidate resource set (for example, a time-frequency resource set, or a code domain resource set) from the preconfigured resource pool or resource set through mapping according to at least one of the sending resource corresponding to the first SL reference signal, a sending resource corresponding to a first location information request, and identifier information of the first terminal; and obtaining the specified report resource from the candidate resource set through mapping according to the identifier information of the second terminal.

For example, a candidate resource location may be determined in a preconfigured resource set or resource pool according to resource information of the first terminal (for example, an SL reference signal time-frequency location, a sequence identifier, a terminal identifier, a sidelink reference signal resource identifier, a group ID, or an intra-group ID of the first terminal), and then the specified report resource is determined according to resource information of the second terminal (for example, an SL reference signal time-frequency location, a sequence identifier, a terminal identifier, an SL reference signal resource identifier, a group ID, or an intra-group ID of the second terminal).

It should be noted that, in a process of determining the specified report resource, if the first terminal determines the unique specified report resource in the preconfigured resource set or resource pool according to the resource information of the first terminal and/or the identifier information of the first terminal, this is applicable to connection-oriented multicast, and the identifier of the first terminal (for example, a group ID and/or an intra-group ID) is known to terminals in the entire group.

If the first terminal performs resource awareness on the preconfigured resource pool or resource set before selecting the specified report resource, mapping is randomly performed on unoccupied resources or the specified report resource is determined according to a specific rule, and this is applicable to disconnection-oriented multicast. The specified report resource may carry an identifier of the resource information of the first terminal or the second terminal.

In another implementation, configuration information of the resource pool or resource set may include at least one of the following (3a) to (3h).

(3a) period information of the resource pool or resource set;
(3b) a time-frequency resource location of the resource pool or resource set;
(3c) a coding mode of the specified report resource;
(3d) a modulation and coding scheme indication of the specified report resource;
(3e) a minimum time interval between the specified report resource and the first SL reference signal;
(3f) a minimum time interval between the specified report resource and the first location information request;
(3g) sizes of report resources corresponding to different terminals; and
(3h) quantities of ports supported by different report resources.
(4) Resource indication information.

The resource indication information may be sent by the second terminal, the control node, or the network side device. In an implementation, the network side device may perform indication by using, for example RRC, a MAC CE, or DCI, and the first terminal may perform indication by using a MAC CE, PC5-RRC, first-level SCI, or second-level SCI. In addition, the resource indication information may be carried on a PSSCH. In some implementations, the resource indication information may be carried in first location request information.

The foregoing manner of obtaining the specified report resource based on (1) to (4) may be based on the network indication or the protocol stipulation, and is not limited herein.

In addition, in a possible implementation, a manner in which the first terminal obtains the specified report resource may be the same as or different from a manner in which the second terminal obtains the sending resource corresponding to the first SL reference signal or the sending resource corresponding to the first location information request. This is not limited herein.

In another possible implementation, based on the foregoing positioning method on the SL, if the first terminal receives a plurality of third SL reference signals or location information requests other than the first SL reference signals within a specified time interval, the first location information and at least one piece of third location information (corresponding to the third SL reference signal) occupy a same report resource. In this case, the process of reporting the first location information by the first terminal may include at least one of the following (1) to (4).

(1) Report the first location information and the at least one piece of third location information according to priority information respectively corresponding to the first location information and the at least one piece of third location information.

(2) Report the first location information and the at least one piece of third location information according to terminal capability information of the first terminal.

(3) Report the first location information and the at least one piece of third location information according to reporting duration respectively corresponding to the first location information and the at least one piece of third location information.

In the foregoing (1) to (3), if the first SL reference signal and the third SL reference signal carry the priority indication information, a report with a lower priority is discarded or postponed (for example, the third location information is discarded or postponed) according to the priority indication information. If the first SL reference signal and the third SL reference signal do not carry priority indication information or carry same priority indication information, as described in (2), the first terminal may perform reporting within a capability of the first terminal according to terminal capability information (N measurement results are reported at the same time), or as described in (3), the first terminal may select, according to duration required by the report, location information that requires a short reporting time to perform reporting. In some implementations, for a report that exceeds a capability range of UE, the terminal may discard or postpone the report.

It can be understood that, when the first terminal performs reporting, reporting may be performed only based on any one of (1) to (3), or may be performed in combination with any two or three of (1) to (3). This is not limited in this embodiment.

In still another implementation, if the first terminal receives a plurality of fourth SL reference signals other than the first SL reference signal within a specified time interval, the first location information and at least one piece of fourth location information (corresponding to the fourth SL reference signal) occupy a same report resource. In this case, the process of reporting the first location information by the first terminal may include: in a case that the first location information and at least one piece of fourth location information occupy a same report resource, select, from the first location information and the at least one piece of fourth location information, target location information closest to the specified report resource (for example, location information corresponding to a closer SL reference signal) for reporting, where a fourth SL reference signal corresponding to the fourth location information and the first SL reference signal are SL reference signals received by the first terminal within predetermined duration. In some implementations, the fourth SL reference signal and the first SL reference signal are from a same terminal. In some implementations, the predetermined duration may be stipulated in the protocol, indicated by the network device, indicated by the second terminal, or the like.

It should be noted that, based on the foregoing implementations provided in this embodiment, at least one of the following (1) to (3) may be obtained through mapping by using an SL channel, and channel information corresponding to the SL channel may be obtained through preconfiguration or a configuration of the network side device. This is not limited herein.

(1) A sending resource corresponding to the first SL reference signal.

The sending resource may include but is not limited to at least one of the following: a time-frequency location, a sequence, a sequence identifier, a reference signal resource identifier, a terminal identifier, an identifier of a group in which a terminal is located and/or an intra-group identifier, a positioning group identifier, and/or a positioning intra-group identifier.

(2) A reporting resource corresponding to the first location information.

(3) A request signaling resource corresponding to the first location information request.

In this case, the SL channel may be configured in a first resource pool, the first resource pool is different from a second resource pool, the first resource pool is used to or dedicated to configure an SL positioning resource used for terminal positioning, and the second resource pool is used to configure a communication resource except the SL positioning resource.

In this embodiment, the SL channel may be obtained through preconfiguration, broadcast, multicast, unicast, or configuration by the control node. This is not limited in this embodiment.

In this embodiment, after receiving a first SL reference signal, a first terminal reports first location information according to a specified report resource, to ensure reliable execution of a positioning process on an SL, so that an SL technology can better adapt to other more advanced V2X services such as a positioning service.

Figure 5:
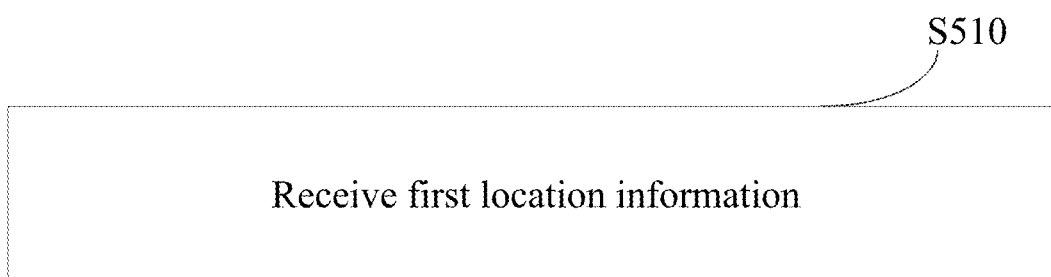
FIG. 5 is a schematic flowchart of a positioning method on an SL according to still another example embodiment of this application.

As shown in FIG. 5, FIG. 5 is a schematic flowchart of a positioning method 500 on an SL according to an example embodiment of this application. The method 500 may be performed by a second terminal or a network side device, for example, may be performed by hardware and/or software installed in the second terminal or the network side device, and the method 500 includes at least the following S510.

S510: Receive first location information, where the first location information includes at least one of the following: a first measurement result, where the first measurement result is obtained by a first terminal by measuring a first SL reference signal used for positioning, and the first SL reference signal is sent by a second terminal and/or a network side device; a second measurement result, where the second measurement result is an additional measurement result obtained by the first terminal by measuring the first SL reference signal except the first measurement result; identifier information; time stamp information; calibration information; relative distance information; absolute location information; relative location information; target event information, where the target event information is used to instruct the first terminal to report that the first location information is related to a target event; and a second location information request, where the second location information request is used to instruct the second terminal to report location information, where the identifier information, the time stamp information, the calibration information, the relative distance information, the absolute location information, and the relative location information are information associated with measuring the first SL reference signal by the first terminal.

In an implementation, the first measurement result includes a difference between a first time and a second time, the first time is a time at which the first terminal receives the first SL reference signal, and the second time is a time at which the first terminal sends a second SL reference signal.

In another implementation, that the first time is a time at which the first terminal receives the first SL reference signal includes: the first time is a time at which the first terminal receives a specified path corresponding to a predetermined SL time unit, and the specified path of the predetermined SL time unit is determined according to the first SL reference signal; and that the second time is a time at which the first terminal sends a second SL reference signal includes: the second time is a corresponding time at which the terminal sends a target SL time unit, and the time of sending the target SL time unit and a time of receiving the predetermined SL time unit satisfy a predetermined requirement.

In still another implementation, the second measurement result includes at least one of an additional arrival path, a measurement result granularity, LOS/NLOS indication information, spatial measurement information, and frequency domain measurement information.

In still another implementation, a first location information request is sent, where the first location information request is used to instruct the first terminal to report the first location information.

In still another implementation, the first location information request carries at least one of the following: a first location information request identifier; a type of the first location information; priority indication information; a reporting time requirement; a quality of service indication; whether an LOS/NLOS indication is required; whether an additional path is required; a quantity of measurement results; a measurement result granularity; whether calibration information needs to be reported; whether identifier information needs to be reported; whether a power measurement result is included; a location information report type, where the location information report type includes at least one of a periodic report, an aperiodic report, and an event trigger report; report resource indication information corresponding to the first location information; resource indication information of the first SL reference signal; a reporting manner of the first location information; and target event information.

In still another implementation, the first location information request is transmitted in a form of unicast, multicast, or broadcast.

In still another implementation, the first location information request is transmitted by using predetermined information, and the predetermined information includes any one of a first-level SCI, second-level SCI, a PSSCH, PC5-RRC, a PC5-MAC CE, an LPP, a MAC CE, RRC, and DCI.

In still another implementation, the first location information request is transmitted simultaneously with the first SL reference signal; and the first location information request is carried in a payload of the first SL reference signal. In some implementations, the first location information request may further be implicitly represented by the first SL reference signal, that is, if the first terminal receives the SL reference signal, the first location information is reported.

In still another implementation, after the sending a first SL reference signal, the method further includes: receiving HARQ information, where the HARQ information is used to instruct the first terminal to report or not to report the first location information, and the HARQ information is associated with the first SL reference signal and/or a first location information request.

In still another implementation, that the HARQ information is used to instruct the first terminal to report or not to report the first location information includes at least one of the following: in a case that the HARQ information is a NACK, reporting, by the first terminal, the first location information; and in a case that the HARQ information is an ACK, not reporting, by the first terminal, the first location information.

In still another implementation, after the receiving first location information, the method further includes: sending fifth location information, where the fifth location information includes at least one of the following: relative distance information between the second terminal and the first terminal; absolute location information of the second terminal; and relative location information of the second terminal.

In still another implementation, at least one of the following is obtained through mapping by using an SL channel: a sending resource corresponding to the first SL reference signal; a report resource corresponding to the first location information; and a request signaling resource corresponding to the first location information request.

In still another implementation, the SL channel is configured in a first resource pool, the first resource pool is different from a second resource pool, the first resource pool is used to configure an SL positioning resource used for terminal positioning, and the second resource pool is used to configure a communication resource except the SL positioning resource.

It can be understood that for the implementations provided in this embodiment, refer to the related descriptions in the foregoing methods 200 to 400. To avoid repetition, details are not described herein again.

In addition, the positioning methods 200, 300, 400, and 500 on the SL provided in the embodiments of this application may be performed by a positioning apparatus on an SL, or a control module that is in the positioning apparatus on the SL and that is configured to perform the positioning method on the SL. In the following parts of the embodiments of this application, an example in which the positioning apparatus on the SL performs the positioning method on the SL is used to describe the positioning apparatus on the SL provided in the embodiments of this application.

Figure 6:
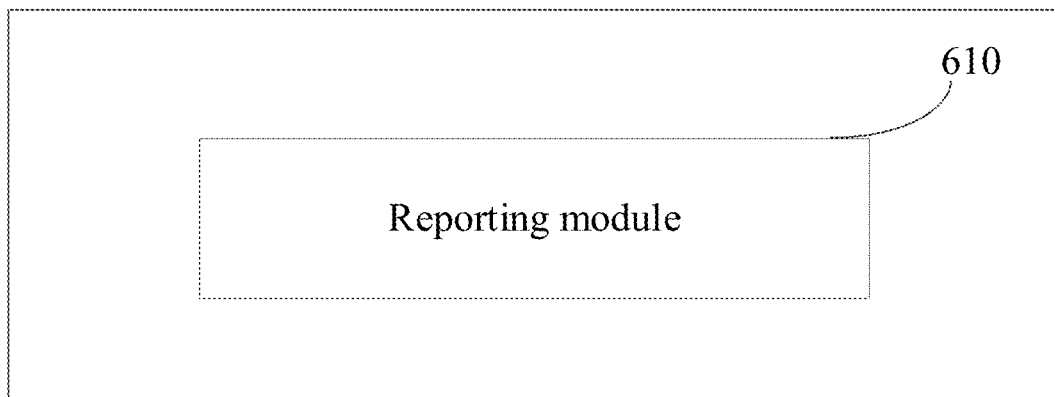
FIG. 6 is a schematic block diagram of a positioning apparatus on an SL according to an example embodiment of this application.

As shown in FIG. 6, FIG. 6 is a schematic block diagram of a positioning apparatus 600 on an SL according to an example embodiment of this application. The positioning apparatus 600 includes: a reporting module 610, configured to report first location information, where the first location information includes at least one of the following: a first measurement result, where the first measurement result is obtained by a first terminal by measuring a first SL reference signal used for positioning, and the first SL reference signal is sent by a second terminal and/or a network side device; a second measurement result, where the second measurement result is an additional measurement result obtained by the first terminal by measuring the first SL reference signal except the first measurement result; identifier information; time stamp information; calibration information; relative distance information; absolute location information; relative location information; target event information, where the target event information is used to instruct the first terminal to report that the first location information is related to a target event; and a second location information request, where the second location information request is used to instruct the second terminal to report location information, where the identifier information, the time stamp information, the calibration information, the relative distance information, the absolute location information, and the relative location information are information associated with measuring the first SL reference signal by the first terminal.

In an implementation, the first measurement result includes a difference between a first time and a second time, the first time is a time at which the first terminal receives the first SL reference signal, and the second time is a time at which the first terminal sends a second SL reference signal.

In another implementation, that the first time is a time at which the first terminal receives the first SL reference signal includes: the first time is a time at which the first terminal receives a specified path corresponding to a predetermined SL time unit, and the specified path of the predetermined SL time unit is determined according to the first SL reference signal; and that the second time is a time at which the first terminal sends a second SL reference signal includes: the second time is a corresponding time at which the terminal sends a target SL time unit, and the time of sending the target SL time unit and a time of receiving the predetermined SL time unit satisfy a predetermined requirement.

In another implementation, the second measurement result includes at least one of an additional arrival path, a measurement result granularity, LOS/NLOS indication information, spatial measurement information, and frequency domain measurement information.

In another implementation, the reporting module 610 is configured to report the first location information according to first specified information, where the first specified information includes at least one of the following: geographical location information; measurement information; fleet information; moving information, where the moving information includes a moving distance and/or a moving speed; whether a first location information request is received; and synchronization information or RRC connection information with the second terminal.

In another implementation, in a case that the first specified information is the geographical location information, the reporting module 610 is configured to perform at least one of the following: reporting the first location information in a case that a distance between the second terminal and the first terminal satisfies a first condition; reporting the first location information in a case that a zone in which the first terminal is located is the same as a zone in which the second terminal is located; reporting the first location information in a case that a zone identifier corresponding to the first terminal is the same as a zone identifier corresponding to the second terminal; reporting the first location information in a case that a specified operation is performed on the zone identifier corresponding to the first terminal and the zone identifier corresponding to the second terminal and an operation result satisfies a second condition; reporting the first location information in a case that the zone in which the second terminal is located and the zone in which the first terminal is located differ by a predetermined quantity of zones in a specified dimension; reporting the first location information in a case that the zone identifier corresponding to the first terminal is a first predetermined value; reporting the first location information in a case that the zone identifier corresponding to the second terminal is a second predetermined value; reporting the first location information in a case that specified control information received by the first terminal carries the zone identifier corresponding to the second terminal; and reporting the first location information in a case that the second terminal leaves a specified zone.

In another implementation, in a case that the first specified information is the measurement information, the reporting module 610 is configured to perform at least one of the following: reporting the first location information in a case that the measurement information includes an RSRP of the first SL reference signal and the RSRP of the first SL reference signal satisfies a third condition; reporting the first location information in a case that the measurement information includes an RSRP of specified control information corresponding to the second terminal and the RSRP of the specified control information satisfies a fourth condition; reporting the first location information in a case that the measurement information includes an RSRP of a specified channel corresponding to the second terminal and the RSRP of the specified channel satisfies a fifth condition; reporting the first location information in a case that the measurement information includes an RSRP of specified request signaling corresponding to the second terminal and the RSRP of the specified request signaling satisfies a sixth condition; and reporting the first location information in a case that the measurement information includes measurement quality of the first SL reference signal and the measurement quality satisfies a seventh condition.

In another implementation, in a case that the first specified information is the moving information, the reporting module 610 is configured to perform at least one of the following: reporting the first location information in a case that the moving information includes a moving distance and the moving distance exceeds a third predetermined value, where the moving distance is a relative distance between a current terminal location and a first location, the first location is a location at which the second terminal reports location information last time, and a reporting time is earlier than a time of reporting the first location information; reporting the first location information in a case that the moving information includes a moving speed and a moving speed of the second terminal satisfies an eighth condition; and reporting the first location information in a case that the moving information includes a moving speed and a difference between the moving speed of the second terminal and a moving speed of the first terminal satisfies a ninth condition.

In another implementation, in a case that the first specified information is whether the first location information request is received, the reporting module 610 is configured to report the first location information in a case that the first location information request is received.

In another implementation, in a case that the first specified information is the synchronization information or the RRC connection information with the second terminal, the reporting module 610 is configured to report the first location information in a case that the first terminal establishes synchronization with the second terminal or in a case that there is an RRC connection between the first terminal and the second terminal.

In another implementation, the method further includes: receiving the first location information request, where the first location information request carries at least one of the following: a first location information request identifier; a type of the first location information; priority indication information; a reporting time requirement; a quality of service indication; whether an LOS/NLOS indication is required; whether an additional path is required; a quantity of measurement results; a measurement result granularity; whether calibration information needs to be reported; whether identifier information needs to be reported; whether a power measurement result is included; a location information report type, where the location information report type includes at least one of a periodic report, an aperiodic report, and an event trigger report; report resource indication information corresponding to the first location information; resource indication information of the first SL reference signal; and a reporting manner of the first location information.

In another implementation, the first location information request is transmitted in a form of unicast, multicast, or broadcast.

In another implementation, the first location information request is transmitted by using predetermined information, and the predetermined information includes any one of a first-level SCI, second-level SCI, a PSSCH, PC5-RRC, a PC5-MAC CE, an LPP, a MAC CE, RRC, and DCI.

In another implementation, the first location information request is transmitted simultaneously with the first SL reference signal; and the first location information request is carried in a payload of the first SL reference signal.

In another implementation, a difference between a reporting time of the first location information and a receiving time of the first location information request is not greater than a fourth predetermined value.

In another implementation, the reporting module 610 is further configured to send HARQ information, where the HARQ information is used to instruct to perform or not to perform the step of reporting first location information, and the HARQ information is associated with the first SL reference signal and/or a first location information request.

In another implementation, that the HARQ information is used to instruct to perform or not to perform the step of reporting first location information includes at least one of the following: in a case that the HARQ information is a NACK, not performing the step of reporting first location information; and in a case that the HARQ information is an ACK, performing the step of reporting first location information.

In another implementation, in a case that HARQ information is not sent, the terminal does not report the first location information, where the HARQ information is associated with the first SL reference signal and/or the first location information request.

In another implementation, the reporting module 610 is configured to report the first location information according to a specified report resource, where the specified report resource is obtained in one of the following manners: a protocol stipulation; a predetermined correspondence, where the predetermined correspondence represents a correspondence between a sending resource corresponding to the first SL reference signal and a report resource corresponding to the first location information, and/or the predetermined correspondence represents a correspondence between identifier information of the second terminal and the report resource corresponding to the first location information; a preconfigured resource pool or resource set; and resource indication information, where the resource indication information is sent by the first terminal or the network side device.

In another implementation, a manner of obtaining the specified report resource through the preconfigured resource pool or resource set includes: obtaining a candidate resource set from the preconfigured resource pool or resource set through mapping according to at least one of the sending resource corresponding to the first SL reference signal, a sending resource corresponding to a first location information request, and identifier information of the first terminal; and obtaining the specified report resource from the candidate resource set through mapping according to the identifier information of the second terminal.

In another implementation, configuration information of the resource pool or resource set includes at least one of the following: period information of the resource pool or resource set; a time-frequency resource location of the resource pool or resource set; a coding mode of the specified report resource; a modulation and coding scheme indication of the specified report resource; a minimum time interval between the specified report resource and the first SL reference signal; a minimum time interval between the specified report resource and the first location information request; sizes of report resources corresponding to different terminals; and quantities of ports supported by different report resources.

In another implementation, the reporting module 610 is configured to perform coupling and reporting on the first location information and second specified information, where the second specified information includes at least one of an SL-RSRP, SL-CSI, and a HARQ.

In another implementation, the reporting module 610 is configured to perform any one of the following in a case that the first location information and at least one piece of third location information occupy a same report resource: reporting the first location information and the at least one piece of third location information according to priority information respectively corresponding to the first location information and the at least one piece of third location information; reporting the first location information and the at least one piece of third location information according to terminal capability information of the first terminal; and reporting the first location information and the at least one piece of third location information according to reporting duration respectively corresponding to the first location information and the at least one piece of third location information.

In another implementation, the reporting module 610 is configured to: in a case that the first location information and at least one piece of fourth location information occupy a same report resource, select, from the first location information and the at least one piece of fourth location information, target location information closest to the specified report resource for reporting, where a fourth SL reference signal corresponding to the fourth location information and the first SL reference signal are SL reference signals received by the first terminal within predetermined duration.

In another implementation, the apparatus 600 may further include a receiving module, configured to receive fifth location information, where the fifth location information includes at least one of the following: relative distance information between the second terminal and the first terminal; absolute location information of the second terminal; and relative location information of the second terminal.

In another implementation, at least one of the following is obtained through mapping by using an SL channel: a sending resource corresponding to the first SL reference signal; a report resource corresponding to the first location information; and a request signaling resource corresponding to the first location information request.

In another implementation, the SL channel is configured in a first resource pool, the first resource pool is different from a second resource pool, the first resource pool is used to configure an SL positioning resource used for terminal positioning, and the second resource pool is used to configure a communication resource except the SL positioning resource.

In this embodiment, a first SL reference signal sent by a second terminal and/or a network side device is measured, and first location information is reported, to implement terminal positioning. Therefore, an SL technology can adapt to other more advanced V2X services such as a positioning service.

Figure 7:
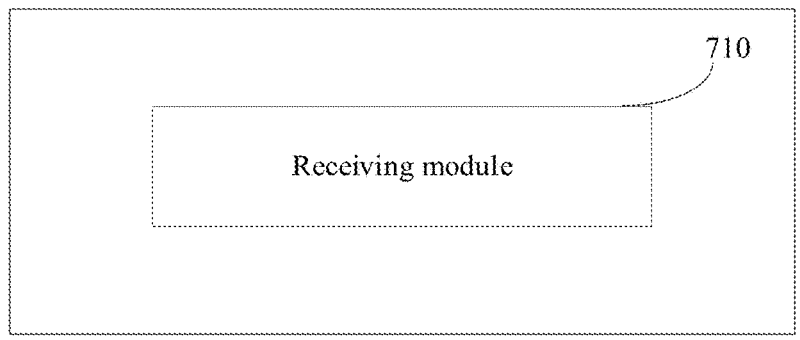
FIG. 7 is a schematic block diagram of a positioning apparatus on an SL according to another example embodiment of this application.

As shown in FIG. 7, FIG. 7 is a schematic block diagram of a positioning apparatus 700 on an SL according to an example embodiment of this application. The positioning apparatus 700 includes: a receiving module 710, configured to receive first location information, where the first location information includes at least one of the following: a first measurement result, where the first measurement result is obtained by a first terminal by measuring a first SL reference signal used for positioning, and the first SL reference signal is sent by a second terminal and/or a network side device; a second measurement result, where the second measurement result is an additional measurement result obtained by the first terminal by measuring the first SL reference signal except the first measurement result; identifier information; time stamp information; calibration information; relative distance information; absolute location information; relative location information; target event information, where the target event information is used to instruct the first terminal to report that the first location information is related to a target event; and a second location information request, where the second location information request is used to instruct the second terminal to report location information, where the identifier information, the time stamp information, the calibration information, the relative distance information, the absolute location information, and the relative location information are information associated with measuring the first SL reference signal by the first terminal.

In an implementation, the first measurement result includes a difference between a first time and a second time, the first time is a time at which the first terminal receives the first SL reference signal, and the second time is a time at which the first terminal sends a second SL reference signal.

In another implementation, that the first time is a time at which the first terminal receives the first SL reference signal includes: the first time is a time at which the first terminal receives a specified path corresponding to a predetermined SL time unit, and the specified path of the predetermined SL time unit is determined according to the first SL reference signal; and that the second time is a time at which the first terminal sends a second SL reference signal includes: the second time is a corresponding time at which the terminal sends a target SL time unit, and the time of sending the target SL time unit and a time of receiving the predetermined SL time unit satisfy a predetermined requirement.

In another implementation, the second measurement result includes at least one of an additional arrival path, a measurement result granularity, LOS/NLOS indication information, spatial measurement information, and frequency domain measurement information.

In another implementation, the apparatus may further include a sending module, configured to send a first location information request, where the first location information request is used to instruct the first terminal to report the first location information.

In another implementation, the first location information request carries at least one of the following: a first location information request identifier; a type of the first location information; priority indication information; a reporting time requirement; a quality of service indication; whether an LOS/NLOS indication is required; whether an additional path is required; a quantity of measurement results; a measurement result granularity; whether calibration information needs to be reported; whether identifier information needs to be reported; whether a power measurement result is included; a location information report type, where the location information report type includes at least one of a periodic report, an aperiodic report, and an event trigger report; report resource indication information corresponding to the first location information; resource indication information of the first SL reference signal; a reporting manner of the first location information; and target event information.

In another implementation, the first location information request is transmitted in a form of unicast, multicast, or broadcast.

In another implementation, the first location information request is transmitted by using predetermined information, and the predetermined information includes any one of a first-level SCI, second-level SCI, a PSSCH, PC5-RRC, a PC5-MAC CE, an LPP, a MAC CE, RRC, and DCI.

In another implementation, the first location information request is transmitted simultaneously with the first SL reference signal; and the first location information request is carried in a payload of the first SL reference signal.

In another implementation, the receiving module 710 is further configured to receive HARQ information, where the HARQ information is used to instruct the first terminal to report or not to report the first location information, and the HARQ information is associated with the first SL reference signal and/or a first location information request.

In another implementation, that the HARQ information is used to instruct the first terminal to report or not to report the first location information includes at least one of the following: in a case that the HARQ information is a NACK, reporting, by the first terminal, the first location information; and in a case that the HARQ information is an ACK, not reporting, by the first terminal, the first location information.

In another implementation, the sending module is further configured to receive fifth location information, where the fifth location information includes at least one of the following: relative distance information between the second terminal and the first terminal; absolute location information of the second terminal; and relative location information of the second terminal.

In another implementation, at least one of the following is obtained through mapping by using an SL channel: a sending resource corresponding to the first SL reference signal; a report resource corresponding to the first location information; and a request signaling resource corresponding to the first location information request.

In another implementation, the SL channel is configured in a first resource pool, the first resource pool is different from a second resource pool, the first resource pool is used to configure an SL positioning resource used for terminal positioning, and the second resource pool is used to configure a communication resource except the SL positioning resource.

In this embodiment, a first terminal measures a first SL reference signal sent by a second terminal and/or a network side device, and reports first location information, to implement terminal positioning. Therefore, an SL technology can adapt to other more advanced V2X services such as a positioning service.

The positioning apparatus 600 or 700 on the SL in the embodiments of this application may be an apparatus, or may be a component, an integrated circuit, or a chip in a terminal. The apparatus may be a mobile terminal, or a non-mobile terminal. For example, the mobile device may include but is not limited to the types of the foregoing listed terminal 11, and the non-mobile terminal may be a server, a Network Attached Storage (NAS), a personal computer, a television, an automated teller machine, or a self-service machine. This is not specifically limited in the embodiments of this application.

The positioning apparatus on the SL in the embodiments of this application may be an apparatus with an operating system. The operating system may be an Android operating system, an iOS operating system, or another possible operating system. This is not specifically limited in the embodiments of this application.

The positioning apparatus on the SL provided in the embodiments of this application can implement the processes implemented in the method embodiments in FIG. 2 to FIG. 5, and achieve a same technical effect. To avoid repetition, details are not described herein again.

Figure 8:
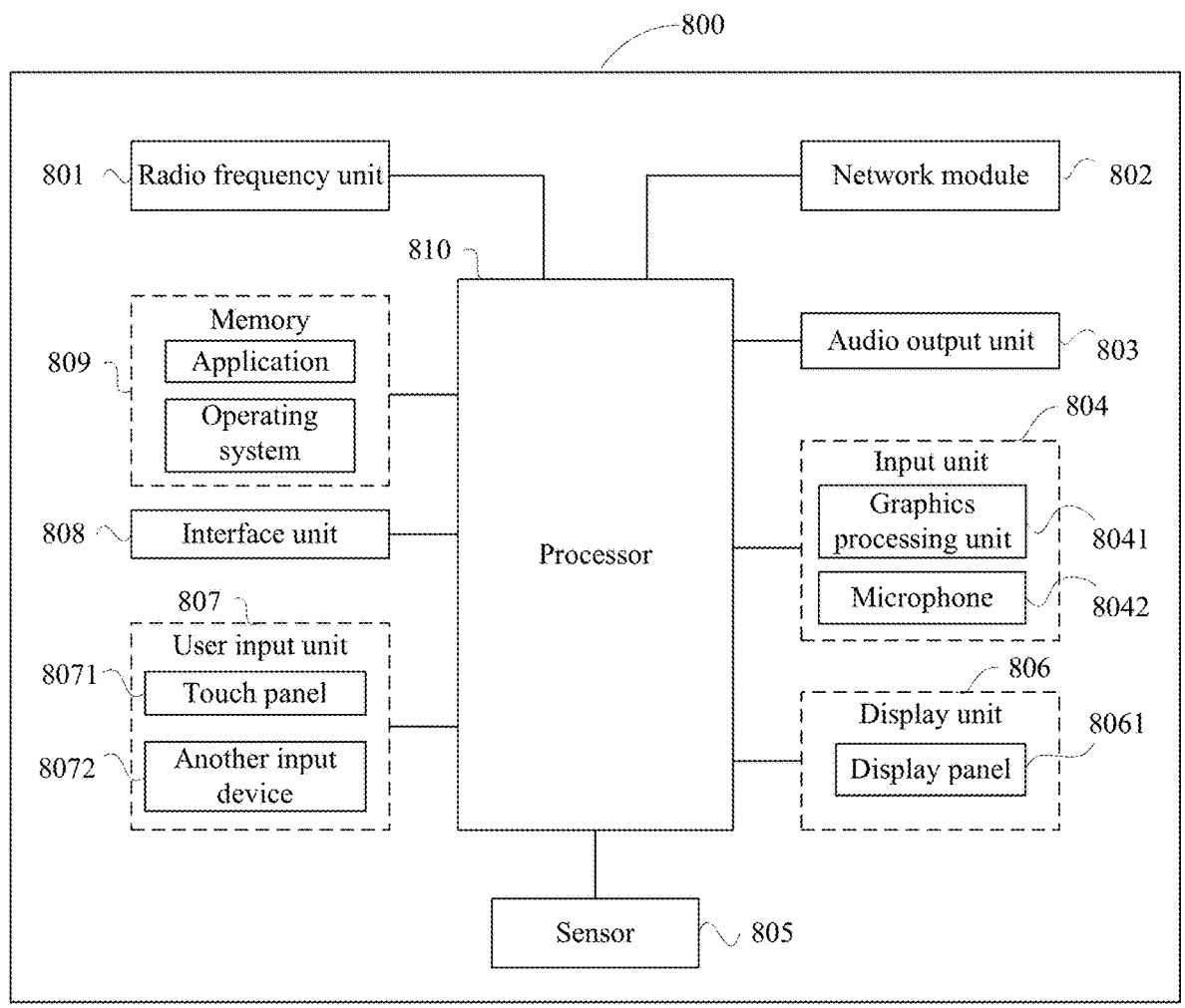
FIG. 8 is a schematic structural diagram of a terminal according to an example embodiment of this application.

FIG. 8 is a schematic structural diagram of hardware of a terminal according to an embodiment of this application. A terminal 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

A person skilled in the art can understand that the terminal 800 may further include a power supply (such as a battery) that supplies power to each component. The power supply may be logically connected to the processor 810 by using a power supply management system, to implement functions such as charging and discharging management, and power consumption management by using the power supply management system. The terminal structure shown in FIG. 8 constitutes no limitation on the terminal, and the terminal may include more or fewer components than those shown in the figure, or combine some components, or have different component arrangements. Details are not described herein.

It should be understood that, in this embodiment of this application, the input unit 804 may include a Graphics Processing Unit (GPU) 1041 and a microphone 8042, and the graphics processing unit 8041 processes image data of a still picture or a video obtained by an image capture apparatus (such as a camera) in a video capture mode or an image capture mode. The display unit 806 may include a display panel 8061. In some implementations, the display panel 8061 may be configured in a form such as a liquid crystal display or an organic light-emitting diode. The user input unit 807 includes a touch panel 8071 and another input device 8072. The touch panel 8071 is also referred to as a touchscreen. The touch panel 8071 may include two parts: a touch detection apparatus and a touch controller. The another input device 8072 may include but is not limited to a physical keyboard, a functional button (such as a volume control button or a power on/off button), a trackball, a mouse, and a joystick. Details are not described herein.

In this embodiment of this application, the radio frequency unit 801 receives downlink data from a network side device and then sends the downlink data to the processor 810 for processing; and sends uplink data to the network side device. Usually, the radio frequency unit 801 includes but is not limited to an antenna, at least one amplifier, a transceiver, a coupler, a low noise amplifier, a duplexer, and the like.

The memory 809 may be configured to store a software program or an instruction and various data. The memory 809 may mainly include a program or instruction storage area and a data storage area. The program or instruction storage area may store an operating system, and an application or an instruction required by at least one function (for example, a sound playing function or an image playing function). In addition, the memory 809 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 810 may include one or more processing units. In some implementations, an application processor and a modem processor may be integrated into the processor 810. The application processor mainly processes an operating system, a user interface, an application, an instruction, or the like. The modem processor mainly processes wireless communications, for example, a baseband processor. It can be understood that, in some implementations, the modem processor may not be integrated into the processor 810.

The radio frequency unit 801 is configured to receive first location information, where the first location information includes at least one of the following: a first measurement result, where the first measurement result is obtained by a first terminal by measuring a first SL reference signal used for positioning, and the first SL reference signal is sent by a second terminal and/or a network side device; a second measurement result, where the second measurement result is an additional measurement result obtained by the first terminal by measuring the first SL reference signal except the first measurement result; identifier information; time stamp information; calibration information; relative distance information; absolute location information; relative location information; target event information, where the target event information is used to instruct the first terminal to report that the first location information is related to a target event; and a second location information request, where the second location information request is used to instruct the second terminal to report location information, where the identifier information, the time stamp information, the calibration information, the relative distance information, the absolute location information, and the relative location information are information associated with measuring the first SL reference signal by the first terminal.

In this embodiment, a first SL reference signal sent by a second terminal and/or a network side device is measured, and first location information is reported, to implement terminal positioning. Therefore, an SL technology can adapt to other more advanced V2X services such as a positioning service.

Figure 9:
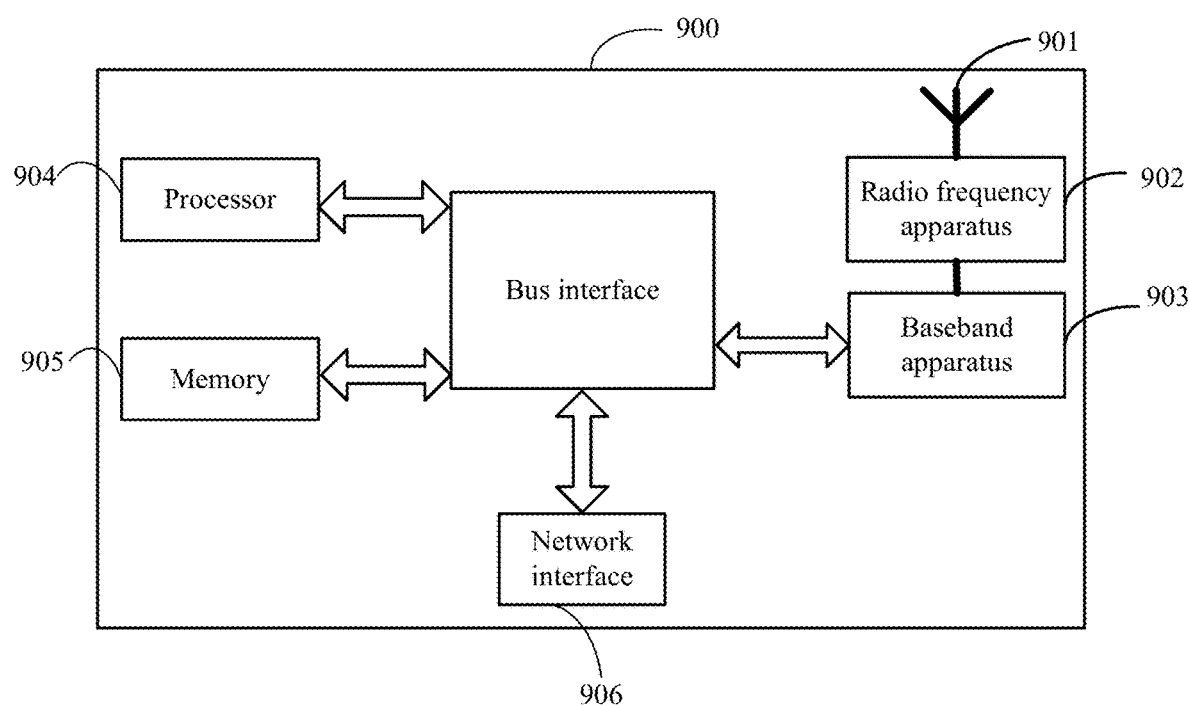
FIG. 9 is a schematic structural diagram of a network side device according to an example embodiment of this application.

As shown in FIG. 9, an embodiment of this application further provides a network side device. A network device 900 includes an antenna 901, a radio frequency apparatus 902, and a baseband apparatus 903. The antenna 901 is connected to the radio frequency apparatus 902. In an uplink direction, the radio frequency apparatus 902 receives information by using the antenna 901, and sends the received information to the baseband apparatus 903 for processing. In a downlink direction, the baseband apparatus 903 processes information that needs to be sent, and sends processed information to the radio frequency apparatus 92. The radio frequency apparatus 92 processes the received information, and sends processed information by using the antenna 91.

The frequency band processing apparatus may be located in the baseband apparatus 903. The method performed by the network side device in the foregoing embodiment may be implemented in the baseband apparatus 903. The baseband apparatus 903 includes a processor 904 and a memory 905.

The baseband apparatus 903 may include, for example, at least one baseband board, where a plurality of chips are disposed on the baseband board. As shown in FIG. 9, one chip is, for example, the processor 904, which is connected to the memory 905, so as to invoke a program in the memory 905 to perform operations of the network device shown in the foregoing method embodiment.

The baseband apparatus 903 may further include a network interface 906, configured to exchange information with the radio frequency apparatus 902. For example, the interface is a Common Public Radio Interface (CPRI for short).

The network side device in this embodiment of the present application further includes an instruction or a program that is stored in the memory 905 and that can be run on the processor 904. The processor 904 invokes the instruction or the program in the memory 905 to perform the method performed by the modules shown in FIG. 7, and a same technical effect is achieved. To avoid repetition, details are not described herein again.

An embodiment of this application further provides a readable storage medium. The readable storage medium stores a program or an instruction, and when the program or the instruction is executed by a processor, the processes of the foregoing embodiment of the positioning method on the SL are implemented and a same technical effect can be achieved. To avoid repetition, details are not described herein again.

The processor is a processor in the terminal in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communications interface, the communications interface is coupled to the processor, and the processor is configured to run a program or an instruction of a network side device to implement the processes of the foregoing embodiment of the positioning method on the SL and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program product. The computer program product includes a processor, a memory, and a program or instruction that is stored in the memory and that can run on the processor. When the program or the instruction is executed by the processor, the processes of the foregoing embodiment of the positioning method on the SL are implemented, and a same technical effect can be achieved. To avoid repetition, details are not described herein again.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A positioning method on a SideLink (SL), performed by a first terminal, comprising:
reporting first location information, wherein the first location information comprises:
a first measurement result, wherein the first measurement result is obtained by the first terminal by measuring a first SL reference signal used for positioning, and the first SL reference signal is sent by a second terminal or a network side device,
wherein the first measurement result comprises a difference between a first time and a second time,
wherein the first time is a time at which the first terminal receives a specified path corresponding to a predetermined SL time unit, and the specified path of the predetermined SL time unit is determined according to the first SL reference signal, and
wherein the second time is a corresponding time at which the first terminal sends a target SI time unit, and the time of sending the target SL time unit and a time of receiving the predetermined SL time unit satisfy a predetermined requirement.

2. The positioning method according to claim 1, wherein the reporting first location information comprises:
reporting the first location information according to first specified information, wherein the first specified information comprises at least one of the following:
geographical location information;
measurement information;
fleet information;
moving information, wherein the moving information comprises a moving distance or a moving speed;
whether a first location information request is received; or
synchronization information or Radio Resource Control (RRC) connection information with the second terminal.

3. The positioning method according to claim 2, wherein when the first specified information is the geographical location information, the reporting the first location information according to first specified information comprises any one of the following:
reporting the first location information when a distance between the second terminal and the first terminal satisfies a first condition;
reporting the first location information when a zone in which the first terminal is located is the same as a zone in which the second terminal is located;
reporting the first location information when a zone identifier corresponding to the first terminal is the same as a zone identifier corresponding to the second terminal;
reporting the first location information when a specified operation is performed on the zone identifier corresponding to the first terminal and the zone identifier corresponding to the second terminal and an operation result satisfies a second condition;
reporting the first location information when the zone in which the second terminal is located and the zone in which the first terminal is located differ by a predetermined quantity of zones in a specified dimension;
reporting the first location information when the zone identifier corresponding to the first terminal is a first predetermined value;
reporting the first location information when the zone identifier corresponding to the second terminal is a second predetermined value;
reporting the first location information when specified control information received by the first terminal carries the zone identifier corresponding to the second terminal; or
reporting the first location information when the second terminal leaves a specified zone.

4. The positioning method according to claim 2, wherein when the first specified information is the measurement information, the reporting, by the first terminal, the first location information according to first specified information comprises any one of the following:
reporting the first location information when the measurement information comprises a Reference Signal Received Power (RSRP) of the first SL reference signal and the RSRP of the first SL reference signal satisfies a third condition:
reporting the first location information when the measurement information comprises an RSRP of specified control information corresponding to the second terminal and the RSRP of the specified control information satisfies a fourth condition;
reporting the first location information when the measurement information comprises an RSRP of a specified channel corresponding to the second terminal and the RSRP of the specified channel satisfies a fifth condition;
reporting the first location information when the measurement information comprises an RSRP of specified request signaling corresponding to the second terminal and the RSRP of the specified request signaling satisfies a sixth condition; or
reporting the first location information when the measurement information comprises measurement quality of the first SL reference signal and the measurement quality satisfies a seventh condition.

5. The positioning method according to claim 2, wherein when the first specified information is the moving information, the reporting the first location information according to first specified information comprises any one of the following:
reporting the first location information when the moving information comprises a moving distance and the moving distance exceeds a third predetermined value, wherein the moving distance is a relative distance between a current terminal location and a first location, the first location is a location at which the second terminal reports location information last time, and a reporting time is earlier than a time of reporting the first location information;

reporting the first location information when the moving information comprises a moving speed and a moving speed of the second terminal satisfies an eighth condition; or reporting the first location information when the moving information comprises a moving speed and a difference between the moving speed of the second terminal and a moving speed of the first terminal satisfies a ninth condition.

6. The positioning method according to claim 2, wherein when the first specified information is whether the first location information request is received, the reporting the first location information according to first specified information comprises;

reporting the first location information when the first location information request is received.

7. The positioning method according to claim 2, wherein when the first specified information is the synchronization information or the RRC connection information with the second terminal, the reporting the first location information according to first specified information comprises:

reporting the first location information when the first terminal establishes synchronization with the second terminal or when there is an RRC connection between the first terminal and the second terminal.

8. The positioning method according to claim 1, wherein before the reporting first location information, the method further comprises:

receiving the first location information request, wherein the first location information request carries at least one of the following:
a first location information request identifier;
a type of the first location information;
priority indication information;
a reporting time requirement;
a quality of service indication;
whether a Line-of-Sight transmission (LOS), Non-Line-of-Sight transmission (NLOS) indication is required;
whether an additional path is required;
a quantity of measurement results;
a measurement result granularity;
whether calibration information needs to be reported;
whether identifier information needs to be reported;
whether a power measurement result is comprised;
a location information report type, wherein the location information report type comprises at least one of a periodic report, an aperiodic report, or an event trigger report;
report resource indication information corresponding to the first location information;
resource indication information of the first SL reference signal;
a reporting manner of the first location information; or
target event information.

9. The positioning method according to claim 8, wherein the first location information request is transmitted simultaneously with the first SL reference signal; and the first location information request is carried in a payload of the first SL reference signal.

10. The positioning method according to claim 8, wherein a difference between a reporting time of the first location information and a receiving time of the first location information request is not greater than a fourth predetermined value.

11. The positioning method according to claim 1, further comprising:

sending Hybrid Automatic Repeat reQuest (HARQ) information, wherein the HARQ information is used to instruct to perform or not to perform reporting first location information, and the HARQ information is associated with the first SL reference signal or a first location information request.

12. The positioning method according to claim 11, wherein that the HARQ information is used to instruct to perform or not to perform the step of reporting first location information comprises at least one of the following:
when the HARQ information is a negative acknowledgement, not performing the step of reporting first location information; or
when the HARQ information is an acknowledgement, performing the step of reporting first location information.

13. The positioning method according to claim 1, further comprising:
not reporting the first location information when HARQ information is not sent, wherein the HARQ information is associated with the first SL reference signal or the first location information request.

14. The positioning method according to claim 1, wherein the reporting first location information comprises:
reporting the first location information according to a specified report resource,
wherein the specified report resource is obtained through a preconfigured resource pool or resource set, and
wherein configuration information of the preconfigured resource pool or resource set comprises at least one of the following:
period information of the resource pool or resource set;
a time-frequency resource location of the resource pool or resource set;
a coding mode of the specified report resource;
a modulation and coding scheme indication of the specified report resource;
a minimum time interval between the specified report resource and the first SL reference signal;
a minimum time interval between the specified report resource and the first location information request;
sizes of report resources corresponding to different terminals; or
quantities of ports supported by different report resources.

15. The positioning method according to claim 1, wherein the reporting first location information comprises:
performing coupling and reporting on the first location information and second specified information, wherein the second specified information comprises at least one of a SideLink Reference Signal Received Power (SL-RSRP), SideLink Channel State Information (SL-CSI), and a Hybrid Automatic Repeat reQuest (HARQ).

16. The positioning method according to claim 1, wherein the reporting first location information comprises:
performing any one of the following when the first location information and at least one piece of third location information occupy a same report resource:
reporting the first location information and the at least one piece of third location information according to priority information respectively corresponding to the first location information and the at least one piece of third location information;
reporting the first location information and the at least one piece of third location information according to terminal capability information of the first terminal; or
reporting the first location information and the at least one piece of third location information according to reporting duration respectively corresponding to the first location information and the at least one piece of third location information.

17. The positioning method according to claim 1, wherein the first location information further comprises further at least one of the following:
a second measurement result, wherein the second measurement result is an additional measurement result obtained by the first terminal by measuring the first SL reference signal in addition to the first measurement result;
identifier information;
time stamp information;
calibration information;
relative distance information;
absolute location information;
relative location information;
target event information, wherein the target event information is used to instruct the first terminal to report that the first location information is related to a target event; or
a second location information request, wherein the second location information request is used to instruct the second terminal to report location information,
wherein the identifier information, the time stamp information, the calibration information, the relative distance information, the absolute location information, and the relative location information are information associated with measuring the first SL reference signal by the first terminal.

18. A first terminal, comprising:
a memory storing computer-readable instructions; and
a processor coupled to the memory and configured to execute the computer-readable instructions, wherein the computer-readable instructions, when executed by the processor, cause the processor to perform operations comprising:
reporting first location information, wherein the first location information comprises:
a first measurement result, wherein the first measurement result is obtained by the first terminal by measuring a first SL reference signal used for positioning, and the first SL reference signal is sent by a second terminal or a network side device,
wherein the first measurement result comprises a difference between a first time and a second time,
wherein the first time is a time at which the first terminal receives a specified path corresponding to a predetermined SL time unit, and the specified path of the predetermined SL time unit is determined according to the first SL reference signal, and
wherein the second time is a corresponding time at which the first terminal sends a target SL time unit, and the time of sending the target SL time unit and a time of receiving the predetermined SL time unit satisfy a predetermined requirement.

19. The first terminal according to claim 18, wherein the first location information further comprises further at least one of the following:
a second measurement result, wherein the second measurement result is an additional measurement result obtained by the first terminal by measuring the first SL reference signal in addition to the first measurement result;
identifier information;
time stamp information;
calibration information;
relative distance information;
absolute location information;
relative location information;
target event information, wherein the target event information is used to instruct the first terminal to report that the first location information is related to a target event; or
a second location information request, wherein the second location information request is used to instruct the second terminal to report location information,
wherein the identifier information, the time stamp information, the calibration information, the relative distance information, the absolute location information, and the relative location information are information associated with measuring the first SL reference signal by the first terminal.

20. A non-transitory computer-readable medium storing instructions that, when executed by a processor, cause the processor to perform operations comprising:
reporting first location information, wherein the first location information comprises:
a first measurement result, wherein the first measurement result is obtained by a first terminal by measuring a first SL reference signal used for positioning, and the first SL reference signal is sent by a second terminal or a network side device,
wherein the first measurement result comprises a difference between a first time and a second time,
wherein the first time is a time at which the first terminal receives a specified path corresponding to a predetermined SL time unit, and the specified path of the predetermined SL time unit is determined according to the first SL reference signal, and
wherein the second time is a corresponding time at which the first terminal sends a target SL time unit, and the time of sending the target SL time unit and a time of receiving the predetermined SL time unit satisfy a predetermined requirement.

* * * * *